United States Patent
Kroog (10) Patent No.: US 12,216,136 B2
(45) Date of Patent: Feb. 4, 2025

(54) AUTOMATED LABORATORY SYSTEM FOR HANDLING LABORATORY SAMPLES

(71) Applicant: Eppendorf AG, Hamburg (DE)

(72) Inventor: Jens-Peter Kroog, Hamburg (DE)

(73) Assignee: Eppendorf AG, Hamburg (DE)

( * ) Notice: Subject to any disclaimer, the term of this patent is extended or adjusted under 35 U.S.C. 154(b) by 798 days.

(21) Appl. No.: 17/413,870

(22) PCT Filed: Dec. 11, 2019

(86) PCT No.: PCT/EP2019/084629
§ 371 (c)(1),
(2) Date: Jun. 14, 2021

(87) PCT Pub. No.: WO2020/120567
PCT Pub. Date: Jun. 18, 2020

(65) Prior Publication Data
US 2022/0065885 A1    Mar. 3, 2022

(30) Foreign Application Priority Data
Dec. 14, 2018  (EP) ..................... 18212806

(51) Int. Cl.
*G01N 35/10* (2006.01)
*G01N 35/00* (2006.01)

(52) U.S. Cl.
CPC ......... *G01N 35/10* (2013.01); *G01N 35/0099* (2013.01); *G01N 2035/103* (2013.01)

(58) Field of Classification Search
None
See application file for complete search history.

(56) References Cited

U.S. PATENT DOCUMENTS 5,955,373 A * 9/1999 Hutchins ............ G01N 35/0099
422/65
6,358,470 B1 * 3/2002 Higuchi .................. B01L 9/543
422/63

(Continued)

FOREIGN PATENT DOCUMENTS

CN       180970664 A    12/2018
DE   102009006511 B4     2/2012

(Continued)

OTHER PUBLICATIONS

PCT/EP2019/084629: filed Dec. 11. 2019; International Search Report; dated Feb. 24, 2020 (12 pages).

(Continued)

*Primary Examiner* — Brian R Gordon
(74) *Attorney, Agent, or Firm* — Barclay Damon LLP (57) ABSTRACT

An automated laboratory system includes a work area with a plurality of predefined workstations. Each of the plurality of predefined workstations occupies a footprint of a standardized microtiter plate. At least one tool holder is structured to move tools above the work area and at least one transport tool is structured to be moved by the tool holder in order to relocate laboratory items within the work area. At least one pipetting tool is structured to be moved by the tool holder in order to pick up and release pipette tips. A holder for pipette tip carriers includes at least one carrying apparatus defining a rectangular through-opening, and a support apparatus connected to the carrying apparatus. An electronic control apparatus is connected to the tool holder and structured to control movements of the transport tool and at least one pipetting tool by the tool holder.

12 Claims, 6 Drawing Sheets

(56) References Cited

U.S. PATENT DOCUMENTS

| | | | | |
|---|---|---|---|---|
| 6,589,483 | B1* | 7/2003 | Maeda | G01N 35/1065 73/863.25 |
| 6,627,446 | B1* | 9/2003 | Roach | G01N 27/44791 436/514 |
| 8,007,741 | B1* | 8/2011 | Heyes | G01N 35/1065 422/511 |
| 8,168,137 | B2* | 5/2012 | Powell | G01N 35/0099 422/50 |
| 9,623,405 | B2* | 4/2017 | Nichols | G01N 35/1072 |
| 2002/0168300 | A1* | 11/2002 | Bramwell | B01L 9/543 211/74 |
| 2003/0031542 | A1* | 2/2003 | Hamel | G01N 35/10 414/331.05 |
| 2003/0215360 | A1* | 11/2003 | Ruddock | G01N 35/109 422/65 |
| 2004/0067170 | A1* | 4/2004 | Higuchi | G01N 35/1074 422/511 |
| 2005/0058573 | A1* | 3/2005 | Frost, III | G01N 35/0099 422/62 |
| 2005/0112783 | A1* | 5/2005 | Evans | G01N 35/1074 435/6.15 |
| 2005/0265900 | A1* | 12/2005 | Gard | G01N 35/109 422/400 |
| 2006/0093530 | A1* | 5/2006 | Ueda | B01L 9/543 422/400 |
| 2006/0216207 | A1* | 9/2006 | Lehto | G01N 35/109 422/510 |
| 2007/0214900 | A1* | 9/2007 | Porat | G01N 35/10 73/863.21 |
| 2008/0031781 | A1* | 2/2008 | Rasnow | B01L 9/543 422/400 |
| 2008/0060719 | A1* | 3/2008 | Massaro | G01N 35/0099 141/237 |
| 2009/0180931 | A1* | 7/2009 | Silbert | B01L 3/0244 73/1.79 |
| 2009/0293643 | A1 | 12/2009 | Powell et al. | |
| 2010/0267771 | A1* | 10/2010 | Bott | G01N 33/54366 514/321 |
| 2012/0291872 | A1* | 11/2012 | Brady | B01L 9/06 422/524 |
| 2012/0294766 | A1* | 11/2012 | Frank | G01N 35/00871 422/63 |
| 2013/0017535 | A1* | 1/2013 | Frey | G01N 35/0099 422/65 |
| 2013/0068041 | A1* | 3/2013 | Naumann | B01L 3/0275 73/864.01 |
| 2013/0280143 | A1* | 10/2013 | Zucchelli | G01N 35/028 422/501 |
| 2017/0052205 | A1* | 2/2017 | Silbert | G01N 35/10 |
| 2018/0088141 | A1* | 3/2018 | Vacic | G01N 21/01 |
| 2018/0147577 | A1* | 5/2018 | Shinya | B05B 15/62 |
| 2019/0107547 | A1* | 4/2019 | VanSickler | G01N 35/04 |
| 2019/0185805 | A1* | 6/2019 | Kohoutek | C12M 25/06 |
| 2019/0336961 | A1* | 11/2019 | Davis | B01L 9/543 |
| 2020/0114344 | A1* | 4/2020 | Mi | G01N 35/10 |
| 2020/0319222 | A1* | 10/2020 | VanSickler | B25J 15/08 |
| 2021/0220833 | A1* | 7/2021 | Nissen | B01L 3/5085 |
| 2021/0389305 | A1* | 12/2021 | Nimri | B01L 3/5085 |
| 2024/0183874 | A1* | 6/2024 | Yamashita | G01N 35/04 |

FOREIGN PATENT DOCUMENTS

| | | |
|---|---|---|
| EP | 1 366 822 A2 | 12/2003 |
| JP | S5958032 A | 4/1984 |

OTHER PUBLICATIONS

PCT/EP2019/084629; filed Dec. 11, 2019; English Translation of International Search Report; dated Feb. 24, 2020 (3 pages).
CN 201980089152.4; filed Dec. 11, 2019; Notification of Second Office Action; dated Mar. 16, 2023 (3 pages).
CN 201980089152.4; filed Dec. 11, 2019; English translation of Notification of Second Office Action; dated Mar. 16, 2023 (2 pages).

* cited by examiner

AUTOMATED LABORATORY SYSTEM FOR HANDLING LABORATORY SAMPLES

CROSS REFERENCE TO RELATED INVENTION

This application is a national stage application pursuant to 35 U.S.C. § 371 of international Application No. PCT/EP2019/084629, filed on Dec. 11, 2019, which claims priority to, and benefit of, European Patent Application No. 18212806.6, filed Dec. 14, 2018, the entire contents of which are hereby incorporated by reference.

FIELD OF TECHNOLOGY

The invention relates to an automated laboratory system for automatically handling laboratory samples.

BACKGROUND

Automated laboratory systems are used, in particular, in biological, biochemical, medical, forensic or chemical laboratories for handling mostly liquid laboratory samples. The handling operations in particular include metering, mixing, dividing, diluting, heating/cooling, biochemically or chemically altering, or analyzing the samples. In the process, the samples may be altered with regard to their quantity, composition, or physically, biochemically, chemically, or in another manner. Automated laboratory systems are used, in particular, for producing dilution series, distributing reagents, transferring samples from vessels to plates, normalizing samples, PCR setups, real-time PCBs, purifying nucleic acids using magnetic bead methods, preparing samples for next-generation sequencing, and processing cell essays or routine pipetting procedures. Handling samples automatically is faster, more accurate and more reliable than doing so manually. An automated laboratory system and a method for handling laboratory samples are described in EP 2 713 166 A1.

The automated laboratory systems epMotion® 5070, 5073, 5075 by Eppendorf AG have a work area with workstations for laboratory items and storage areas for gripper and pipetting tools. Samples can be stored and handled in the laboratory items. The laboratory items include, for example, reagent vessels, reaction vessels, reservoirs, microtiter plates (microplates), pipette tips and waste containers. Laboratory items are placed directly on the workstations or stored in storage devices on the workstations. Said storage devices include, for example, pipette tip carriers, holders for pipette tip carriers, racks for reservoirs or vessels, and adapters for adjusting the height of microtiter plates. A carrier for pipette tips comprising a pipette tip holder and a pipette tip carrier is described in DE 10 2009 006 511 B4. A modular storage system for laboratory liquids is described in EP 2 168 684 B1.

Furthermore, the automated laboratory systems comprise an XYZ robot arm having a tool holder to which a gripper tool and a pipetting tool can optionally be connected. A gripper tool, a pipetting tool and a tool holder for an automated laboratory system are described in EP 1 407 861 B1. The robot arm can be moved in a program-controlled manner in order to pick up a gripper or pipetting tool from a storage place or set said tool down thereon, to relocate laboratory items in the work area using the gripper tool, to pick up and release pipette tips using the pipetting tool, and to take up and dispense liquids using the pipette tips.

The pipetting tools have at least one neck onto which a pipette tip can be clamped in a sealing manner. By means of a displacement apparatus arranged in the pipetting tool and connected to a hole in the neck via a line, air can be displaced through an upper opening in the pipette tip in order to aspirate or expel liquid through a lower opening of the pipette tip. In the case of a multiple pipetting tool, the necks for clamping on pipette tips are arranged in one or more rows corresponding at least to some of the wells in a standardized microtiter plate. Standardized microtiter plates having 96 or 384 wells and multiple pipetting tools adapted to the spacing of the wells are used, in particular. The pipette tips made of plastics material can be separated from the pipetting tool and discarded in a waste container after one single use in order to prevent cross-contamination of different laboratory samples during metering.

The workstations have a rectangular format adapted to the footprint of a standardized microtiter plate (SBS/ANSI format) in order to store thereon standardized microtiter plates, pipette tip carriers or other laboratory items having a footprint that corresponds to the footprint of a standardized microtiter plate. The footprints of the workstations are limited by alignment means, which ensure precise alignment of the laboratory items.

The pipette tip carriers hold a plurality of pipette tips in holes arranged in a manner corresponding to the wells of a standardized microtiter plate. By means of a multiple pipetting tool that holds multiple pipette tips in an arrangement that corresponds to the arrangement of some or all wells of a standardized microtiter plate, a plurality of pipette tips can be taken up out of a pipette tip carrier at the same time and liquids can be dispensed into or taken up from a plurality of wells of a microtiter plate at the same time.

A large number of pipette tips in multiple pipette tip carriers that must be provided on the workstations of the automated laboratory system are often required for handling laboratory samples. The automated laboratory systems epMotion® 5070, 5073 and 5075 have four, six and 12 to 15 workstations. The installation area required for setting up the automated laboratory systems increases with the number of workstations.

Furthermore, automated laboratory systems are known which comprise, on one side, a magazine and a feeding apparatus for pipette tip carriers in which pipette tips are held. These additional apparatuses increase the installation area of the automated laboratory system. However, installation space is often limited in a laboratory.

US2009/293643 A1 describes an automated laboratory system for automatically handling laboratory samples, comprising a work area having workstations for laboratory items, a robot arm for moving laboratory items in the work area, a pipetting head that can be moved in the work area and a holder for pipette tips.

CN 108970664 A describes an apparatus for transferring pipette tips that comprises a magazine box having comb-like carriers arranged one above the other on a holder and a laboratory tip box in the holder. Pipette tips are held in the comb-like carriers. By pulling out carrier apparatuses, pipette tips can be conveyed downward into the laboratory tip box. If the laboratory tip box is full, it can be removed from the holder and an empty laboratory tip box can be inserted into the holder in order to be filled with pipette tips.

Proceeding from this, the object of the invention is to provide an automated laboratory system that allows for a larger number of pipette tips to be stored in a space-saving manner. Furthermore, a use of an automated laboratory system is proposed in which pipette tips can be stowed away in a space-saving manner.

BRIEF SUMMARY OF THE INVENTION

An embodiment of an automated laboratory for automatically handling liquid laboratory samples comprises a work area, multiple predefined workstations for laboratory items in the work area that have a format adapted to the footprint of a standardized microtiter plate, and at least one movement device for moving tools above the work area. In an embodiment, the automated laboratory further comprises at least one transport tool that can be moved by means of the movement device in order to relocate laboratory items in the work area, at least one pipetting tool that can be moved by means of the movement device in order to pick up and release pipette tips and to take up and dispense liquids by means of the pipette tips in the work area, and a holder for pipette tip carriers that comprises at least one carrying apparatus having a rectangular through-opening and a support apparatus connected to the carrying apparatus. The holder is configured to place the support apparatus on the work area next to a workstation, to hold the carrying apparatus above a pipette tip carrier that is mounted on the workstation and that has a footprint adapted to the footprint of a standardized microtiter plate, to pick up pipette tips from the pipette tip carrier mounted below the carrying apparatus through the through-opening of the carrying apparatus by means of the pipetting tool, and to mount a pipette tip carrier that has a footprint adapted to the footprint of a standardized microtiter plate on the carrying apparatus. An electronic control apparatus is connected to the movement device and is configured to control the movements of the transport tool and of the pipetting tool by means of the movement device such that pipette tips can be picked up from the pipette tip carrier mounted on the carrying apparatus by means of the pipetting tool, the pipette tip carrier can be taken off the carrying apparatus by means of the transport tool and pipette tips can be picked up from a pipette tip carrier mounted below the carrying apparatus through the through-opening of the carrying apparatus by means of the pipetting device.

In an embodiment of the automated laboratory system, a larger number of pipette tip carriers with pipette tips held therein can be stored in the work area, because pipette tip carriers with pipette tips held therein are mounted one above the other at least two different heights by means of the holder on one or more workstations. In an embodiment of the holder, only two or more than two pipette tip carriers can be mounted one above the other on the same workstation. Prior to the automatic handling of laboratory samples, the automated laboratory system can be equipped by hand with pipette tip carriers with pipette tips held therein. During the automatic sequence, the pipetting tool can pick up pipette tips from the uppermost pipette tip carrier on a holder and drop the contaminated pipette tips into a waste container after the pipetting procedure. When all pipette tips have been removed from the uppermost pipette tip carrier, the automated laboratory system can remove the uppermost pipette tip carrier from the holder by means of the transport tool and also drop said pipette tip carrier into the waste container. Afterwards, the automated laboratory system can take pipette tips from the pipette tip carrier arranged below the carrying apparatus of the holder through the through-opening of the carrying apparatus of the holder by means of the pipetting tool. When all pipette tips have been taken from said pipette tip carrier and pipette tips are stored below in another pipette tip carrier on another carrying apparatus, the transport tool can remove the emptied pipette tip carrier and then the pipetting tool can take pipette tips from the pipette tip carrier arranged below the two upper carrying apparatuses through the through-hole of the two upper carrying apparatuses. In this way, the pipette tips can be removed from all pipette tip carriers mounted on the same workstation.

In an embodiment of the automated laboratory system, the number of pipette tips stored on the work area can be multiplied. In the case of arrangement at only two levels one above the other, a doubling of the number of pipette tips is possible, and in the case of arrangement at more than two levels one above the other, a correspondingly increased number of pipette tips can be stowed.

In the present application, the term "standardized microtiter plates" refers to microtiter plates that are standardized as per the recommendations of the Society for Biomolecular Screening (SBS) by the American National Standard Institute (ANSI) (ANSI SLAS 1-4-2004 and ANSI SLAS 6-2012). These microtiter plates have a substantially rectangular footprint with outer dimensions (length 127.76 mm, width 85.48 mm), corner radii and tolerances that are set out in the standard ANSI SLAS 1-2004 (earlier: ANSFSBS 1-2004). In the automated laboratory system according to the invention, the workstations are designed such that microtiter plates and other laboratory items having the footprint of the standardized microtiter plates can be placed on them.

In the present application, the term "pipette tip carrier" refers to a plate-like device that comprises a plurality of holes in a matrix arrangement in which the pipette tips can be inserted. The pipette tip holder is a tube or box having a rectangular cross-section, wherein a pipette tip carrier can be placed on the upper edge of the tube or box such that the pipette tips engage in the tube or box through an upper opening. The pipette tip carriers and pipette tip holders have a footprint that is adapted to the footprint of a standardized microtiter plate.

According to one embodiment, the holder comprises only one carrying apparatus, such that a pipette tip carrier can be mounted on the carrying apparatus and below that another pipette tip carrier can be mounted on the same workstation. According to another embodiment, the holder comprises more than one carrying apparatus, such that multiple pipette tip carriers can be mounted one above the other on carrying apparatuses and below that another pipette tip carrier can be mounted on the same workstation. The pipette tip carriers that are not mounted on a carrying apparatus can be mounted on pipette tip holder that is mounted on the workstation. In this case, the pipette tips inserted in the pipette tip carriers reach into the pipette tip holder. Furthermore, it is possible to place said pipette tip carriers directly on the workstation, wherein the workstation comprises a recess into which the pipette tips held in the pipette tip carrier reach. Furthermore, it is possible for the workstation to comprise a recess into which the pipette tip carrier with the pipette tips held therein can be inserted, wherein the pipette tip carrier is supported in the recess at a distance above the base of the recess such that the pipette tips held in the pipette tip carrier have enough space below in the recess. This embodiment is advantageous for stowing pipette tip carriers at more than two levels on the same workstation.

According to another embodiment, the holder comprises a bearing apparatus via which the support apparatus is supported on the work area. The bearing apparatus is configured to receive a pipette tip carrier that has a footprint adapted to the footprint of a standardized microtiter plate in a rectangular receiving opening or to support said pipette tip carrier on the edge. The bearing apparatus may also be configured to align the holder in a predefined manner on a workstation and/or the pipette tip carrier in a predefined manner on the holder. In another embodiment, the holder comprises no bearing apparatus and the support apparatus is supported directly on the work area.

According to another embodiment, the support apparatus is a rectangular first frame and/or the bearing apparatus is a rectangular second frame. The frame configuration is advantageous for precise alignment of the holder on a workstation and of the pipette tip carriers on the holder and facilitates a material-saving and stable configuration of the holder.

The holder can be configured to be sufficiently stable such that it withstands the pressing forces while also clamping multiple pipette tips one a multichannel pipetting tool at the same time. In the case of an eight-channel pipetting tool said forces can for example reach a total of 120 newton. The holder is manufactured, for example, from stainless steel or another metal material and/or from a plastics material having a suitable strength.

According to another embodiment, the dimensions of the through-opening in the first frame are smaller than the dimensions of the receiving opening in the second frame, such that the carrying apparatus can support a pipette tip carrier on the outer edge and the bearing apparatus can receive a pipette tip carrier in the receiving opening.

According to another embodiment, the support apparatus comprises at least one rod or other linear connecting bar that is connected at the top to the carrying apparatus. According to another embodiment, the at least one rod or other linear connecting bar is connected at the bottom to the bearing apparatus. According to another embodiment, the at least one rod or other linear connecting bar is connected at the top to the first frame and at the bottom to the second frame. These embodiments are particularly material-saving and stable. According to another embodiment, the first frame and the second frame are interconnected via at least one pair of rods or other linear connecting bars that oppose one another on parallel sides of the frames. According to another embodiment, the first frame and the second frame are interconnected in each case on the same side of the frame via two rods. According to another embodiment, they are interconnected on the long sides of the frames.

A pipette tip carrier is supported by means of a frame on the edge in a uniform manner, such that the pipette tip carrier is loaded evenly when the pipette tips are clamped onto the seats of the pipetting tool and can be designed in a material-saving manner. In another embodiment, the carrying apparatus and/or the bearing apparatus in each case comprises multiple carrying and/or bearing elements on which a pipette tip carrier can be supported. In this embodiment, the relevant pipette tip carrier can be supported on the outer edge in multiple sections without a support in between. The embodiment may for example be used in order to be able to grip and remove a pipette tip carrier arranged below a carrying apparatus by means of the transport tool in an unhindered manner.

According to another embodiment, the workstations are delimited by an arrangement of first aligning elements that are designed to align a standardized microtiter plate inserted in between on the workstation, and the holder comprises, in the lower edge region, second aligning elements having a complementary shape to the first aligning elements for aligning the holder with the first aligning elements. As a result, the holder can be aligned precisely on the workstation.

According to another embodiment, the first aligning elements comprise multiple first pins and at least one first spring element, which point up from the work area next to the corners of the workstations, and the second aligning elements comprise first aligning holes designed to receive the first pins and the first spring element. According to another embodiment, the first aligning holes are open toward the inside of the second frame. As a result, the first aligning elements can simultaneously align the holder and a standardized microtiter plate or another laboratory item with the footprint of a standardized microtiter plate on the workstation.

According to another embodiment, the carrying apparatus is arranged at a distance from the bottom side of the holder that exceeds the height of an arrangement consisting of a pipette tip holder with a pipette tip carrier placed thereon and pipette tips held in the pipette tip carrier. The distance is preferably is the range of 35 mm to 110 mm for the use of conventional pipette tip holders, pipette tip carriers and pipette tips. This embodiment is particularly suitable for placement of an arrangement consisting of a pipette tip holder and a pipette tip carrier on top on the carrying apparatus, as this prevents a collision with the corresponding arrangement below the first carrying apparatus.

According to another embodiment, the distance between the carrying apparatus and the bottom side of the holder is such that pipette tips held in a pipette tip carrier placed on the carrying apparatus end at the bottom above the pipette tips in a pipette tip carrier placed on a pipette tip holder. The distance is preferably is the range of 70 mm to 230 mm for the use of conventional pipette tip holders, pipette tip carriers and pipette tips. On account of this embodiment, the pipette tips in the pipette tip carrier that is placed directly on the carrying apparatus are prevented from colliding with or becoming jammed in the pipette tips held in a pipette tip carrier on a pipette tip holder below the carrying apparatus.

According to another embodiment, on the inner sides of at least two parallel frame parts, the first frame of the holder comprises rest ledges that are offset downward with respect to the top side of the first frame and that delimit the through-opening for mounting a pipette tip carrier or pipette tip holder on at least two parallel edges. A pipette tip carrier or pipette tip holder placed on the rest ledges can be guided by means of the edges of the through-opening and aligned on the holder. By supporting the pipette tip carrier or pipette tip holder on only two parallel edges, a large through-opening can be provided for inserting the pipetting tool, in another embodiment, the two ledges are arranged on the two narrow sides of the first frame.

According to another embodiment, the first frame of the holder comprises a row of holes for receiving pipette tips on the outer edge of at least one frame part. This makes it possible to accommodate additional pipette tips, such that the number of pipette tips available for the automatic handling of laboratory samples is increased further. Pipette tips of the same type as the pipette tips in the pipette tip carriers or of another type may be held in the holes in the frame. According to another embodiment, the first frame comprises the row of holes for receiving pipette tips on a narrow frame side.

According to another embodiment, the pipetting tool is a pipetting tool comprising at least one plunger-cylinder apparatus, comprising one or more necks or other seats for clamping on one or more pipette tips, wherein the plunger-cylinder apparatus is connected to a hole in each seat via one or more lines. The pipette tips may be securely clamped on the seat either by being directly clamped on the seat or in a sealing manner by means of at least one O-ring held on the seat. The necks are preferably conical or cylindrical. Each plunger can be moved in the cylinder of the plunger-cylinder apparatus by means of the movement apparatus. The pipetting device is preferably designed in the manner of the metering tool in EP 1 407 861 B1. The metering tool described therein may be designed as a multichannel metering tool, wherein the output is connected to multiple parallel plunger-cylinder apparatuses that are connected to parallel necks for fitting pipette tips. Alternatively, the pipetting tool may be designed in the manner of the metering tool described in DE 10 2016 111 910 A1 or DE 10 2016 111 912 A1. In this regard, reference is made to the documents mentioned above, the content of which is hereby incorporated into this application.

According to another embodiment, the transport tool is a gripper tool that comprises gripping arms that can pivot about a horizontal axis, that comprise needles projecting on mutually facing inner sides and that can be pivoted together by means of the movement device in order to grip a laboratory item and pivoted apart in order to release a laboratory item. The gripper tool is preferably designed in the manner described in EP 1 407 861 B1. In this regard, reference is made to the document EP 1 407 861 B1, the content of which is hereby incorporated by reference into this application.

Another embodiment comprises a predefined storage place in the work area for the transport tool and an adapter having a rectangular tube that can be placed on the storage place by its lower edge, having means for positive connection to the transport tool, and the upper edge of which is designed to carry a pipette tip carrier such that pipette tips inserted therein reach into the tube. As a result, additional storage places are provided in the work area for pipette tips. In principle, the pipette tips can be removed from the pipette tip carrier if same is arranged on the adapter. If the transport tool interferes with the removal of the pipette tips from the pipette tip carrier, firstly, the transport tool can be moved away from the storage place and transferred to another location. If no other storage location is available or the movement device is not suitable for removing all pipette tips from the pipette tip carrier on the adapter by means of the pipetting device, firstly, the pipette tip carrier can be taken off the adapter by means of the transport tool and placed down on a carrying apparatus of a holder or on a pipette tip holder on a workstation. Afterwards, pipette tips can be removed from said pipette tip carrier by means of the pipetting device.

According to another embodiment, the storage place comprises an arrangement of third aligning elements and the adapter comprises fourth aligning elements at the bottom that have a complementary shape to the third aligning elements for aligning the adapter with the third aligning elements on the storage place and/or the adapter comprises an arrangement of fifth aligning elements on the upper edge that are designed to align a pipette tip carrier having a footprint adapted to the footprint of a standardized microtiter plate on the adapter. This makes it possible to precisely align the pipette tip carrier on the storage place, which facilitates the automatic pick-up of the pipette tip carrier by the gripper tool and/or of pipette tips by the pipetting tool. According to another embodiment, the third aligning elements comprise multiple second pins that point up from the storage place and the fourth aligning elements comprise second aligning holes on the bottom side of the adapter that are designed to receive the second pins. According to another embodiment, the fifth aligning elements comprise multiple upwardly pointing third pins and at least one second spring element on the corners of the upper edge of the adapter. The adapter is also suitable for storing another laboratory item, for example a microtiter plate or another laboratory item of which the footprint matches the footprint of a standardized microtiter plate.

According to another embodiment, the movement device comprises a tool holder that is designed to be connected to either the pipetting tool or the gripper tool or to another transport tool. According to another embodiment, the tool holder is designed to transfer a drive movement from the movement device to the pipetting tool or to the transport tool in order to control the movement of the plunger of the at least one plunger-cylinder apparatus or the movement of a gripper arm or another element for gripping a laboratory item.

According to another embodiment, the tool holder is designed in the manner described in EP 1 407 861 B1. In this regard, reference is made to the document EP 1 407 861 B1, the content of which is hereby incorporated by reference into this application.

Liquid laboratory samples, reagents and other liquids can be handled by means of the automated laboratory system according to the invention. Such liquids include pure liquids and single-phase and multi-phase mixtures of liquids (e.g. solutions and emulsions as well as mixtures of liquids and solids (e.g. suspensions).

In the use of the automated laboratory system for automatically handling liquid samples, pipette tips in a pipette tip carrier having a footprint adapted to the footprint of a standardized microtiter plate are provided on a predefined workstation. The holder with the support apparatus is placed next to a pipette tip carrier on the work area such that the carrying apparatus is arranged above the pipe tip carrier. Pipette tips in a pipette tip carrier having a footprint adapted to the footprint of a standardized microtiter plate are provided on the carrying apparatus of the holder. Pipette tips are taken out of the pipette tip carrier on the carrying apparatus by means of the pipetting tool and released thereby after liquid has been transferred. The pipette tip carrier is taken off the carrying apparatus by means of the transport tool, and pipette tips are taken out of a pipette tip carrier arranged below the carrying apparatus through the through-opening of the carrying apparatus by means of the pipetting tool and are used to transfer liquid.

The advantageous effects of the automated laboratory system explained above also apply to the use. This is also the case for the following embodiments of the use.

According to one embodiment, a pipette tip carrier is placed on the workstation and the pipette tips held therein reach into a recess in the workstation or a pipette tip carrier is placed on a pipette tip holder and the pipette tip holder is placed on the workstation and/or a pipette tip carrier is placed on the carrying apparatus or the pipette tip carrier is placed on top on a pipette tip holder and the pipette tip holder is placed on the carrying apparatus.

According to another embodiment, if no pipette tip carrier is arranged on the carrying apparatus, a pipette tip carrier is taken off the adapter by means of the transport tool and placed on a carrying apparatus of the holder or a pipette tip holder arranged thereon and pipette tips are picked up from the pipette tip carrier on the carrying apparatus by means of the pipetting tool and used to transfer liquid.

According to another embodiment, in which pipette tips are arranged one above the other in pipette tip carriers and holders above multiple predefined workstations, firstly, the pipette tips are taken out of the uppermost pipette tip carrier above a workstation by means of the pipetting tool, then the uppermost pipette tip carrier is removed from the uppermost carrying apparatus by means of the transport tool, then pipette tips are taken out of a pipette tip carrier mounted below the uppermost carrying apparatus by means of the pipetting tool, and the process is repeated accordingly until the pipette tips have been taken out of all pipette tip carriers arranged on the same workstation. Then, the pipette tips are taken out of pipette tip carriers arranged at various heights on another workstation. In an alternative embodiment, firstly, pipette tips are taken out of pipette tip carriers arranged on various holders above various workstations by means of the pipetting tool. Then, the transport tool can remove the pipette tip carriers from the uppermost carrying apparatuses and then the pipetting tool can take pipette tips out of pipette tip carriers mounted below the uppermost carrying apparatuses. As a result, in the case of an automated laboratory system comprising a movement device that can only be equipped alternately with the transport tool and the pipetting tool, retooling times can be reduced.

BRIEF DESCRIPTION OF THE DRAWINGS

The invention will be further explained below with reference to the accompanying drawings of exemplary embodiments. In the drawings.

DETAILED DESCRIPTION OF THE INVENTION

Figure 1:
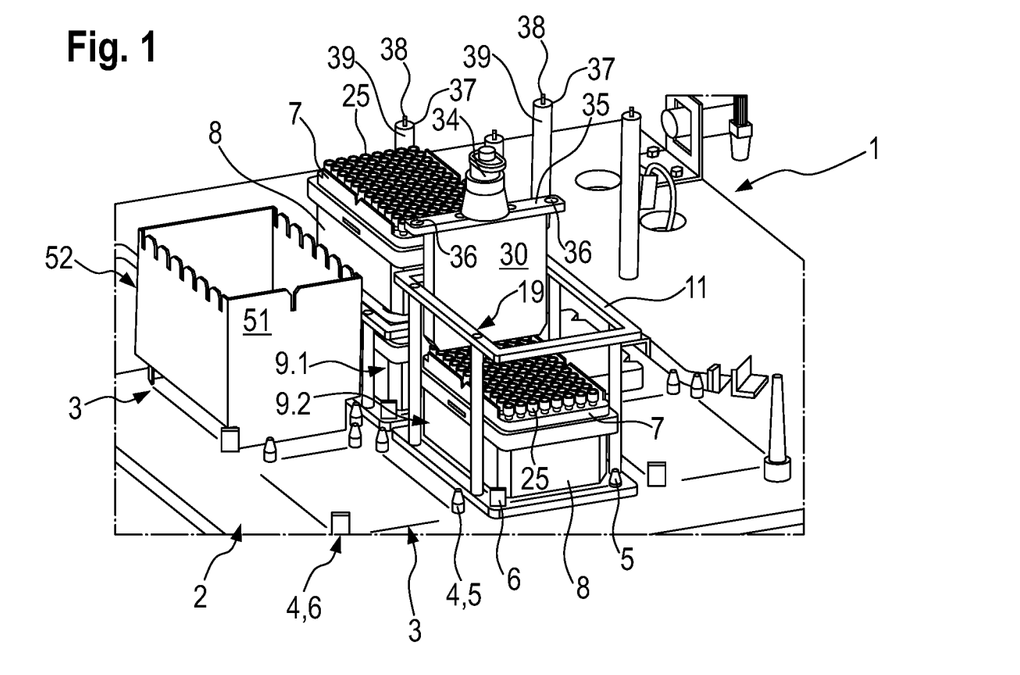
FIG. 1 illustrates a perspective side view of an embodiment of workstations in a work area of an automated laboratory system with holders and pipette tip carriers.

According to FIG. 1, an automated laboratory system 1 comprises multiple workstations 3 for standardized microtiter plates on a flat work area 2 (worktop). Accordingly, each workstation 3 has a format adapted to the footprint of a standardized microtiter plate.

Each workstation 3 is delimited by an arrangement of first aligning elements 4 that are formed by tour first pins 5 rigidly connected to the work area and by a first spring element 6. Two first pins 5 are arranged next to a corner of the workstation on the ends of a long and a short side of the workstation. The first spring element 6 is arranged on a corner of the workstation that is diametrically opposite said corner. Additional first pins 5 are arranged next to the other corners adjacent to the long and short side edges of the workstation 3. In the example, the automated laboratory system comprises six workstations 3.

A standardized microtiter plate can be placed on each workstation 3, wherein the microtiter plate is enclosed by the first aligning elements 4. In this connection, the microtiter plate laterally guided by the first pins 5 and pressed against the first pins 5 by the first spring element 6. The pipette tip carriers 7 and pipette tip holders 8 and other laboratory items shown in the drawings have a footprint that is adapted to the footprint of the standardized microtiter plate. In the lower region, hey are designed such that they can be aligned on a workstation 3 by means of first aligning elements 4.

One low and one large holder 9.1, 9.2 that are used to hold pipette tip carriers 7 and pipette tip holders 8 are arranged on two workstations 3. According to FIG. 3, the low holder 9.1 comprises a carrying apparatus 10 at the top which is formed by a rectangular first frame 11. Additionally, the low holder 9.1 comprises a support apparatus 12 in the form of four rods 13 that project from the bottom side of the first frame and are connected thereto. Finally, the low holder 9.1 comprises a bearing apparatus 14 in the form of a rectangular second frame 15, to which the rods 13 are connected and from the top side of which they project upward. The rods 13 are connected to the first and second frames 11, 15 by means of screws 16. The screw heads 17 of the screws are arranged in depressions 18 in the frames 11, 15, such that they do not protrude outward.

Figure 3:
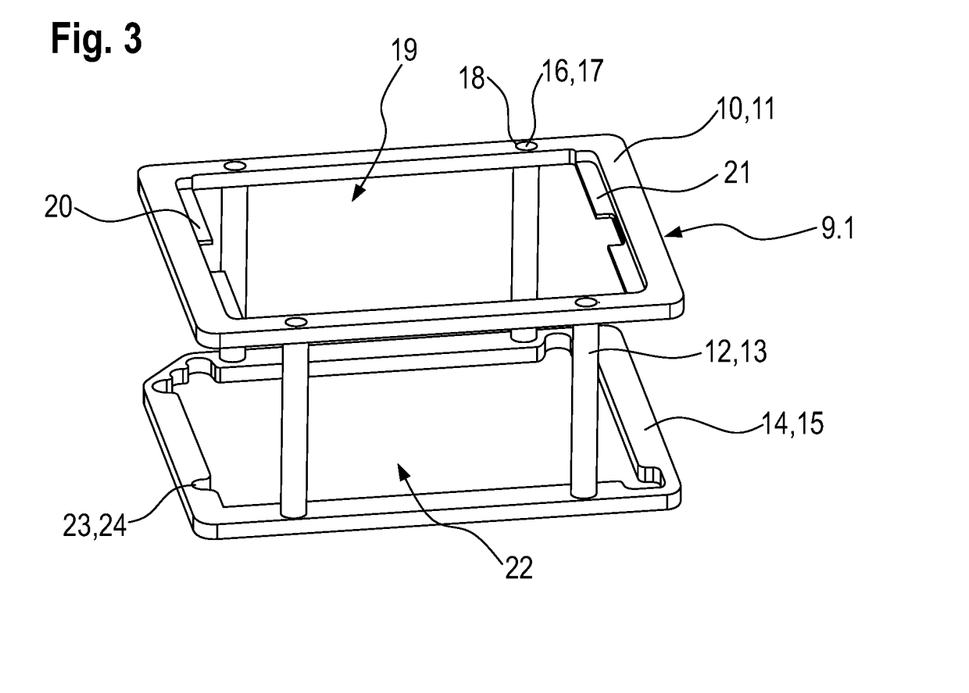
FIG. 3 illustrates a top perspective view of an embodiment of a low holder of the workstation.

The first frame 11 comprises a rectangular through-opening 19. On both parallel short frame parts, the first frame 11 has rest ledges 20, 21 that are offset downward with respect to its top side and that delimit the through-opening 19 on both sides. The second frame 15 comprises a rectangular receiving opening 22. The dimensions of the receiving opening 22 are greater than the dimensions of the through-opening 19, such that the receiving opening 22 can receive a standardized microtiter plate.

At the corners, the second frame 15 comprises second aligning elements 23 in the form of first aligning holes 24 that are designed to receive the first pins 5 and the first spring element 6. The first aligning holes 24 are open toward the inside of the second frame 15. In an embodiment, the holder is manufactured from stainless steel. According to FIGS. 1 and 2, the first necks 5 and the first spring element 6 engage in the first aligning holes 24 and align the holder on the workstation 3.

Figure 2:
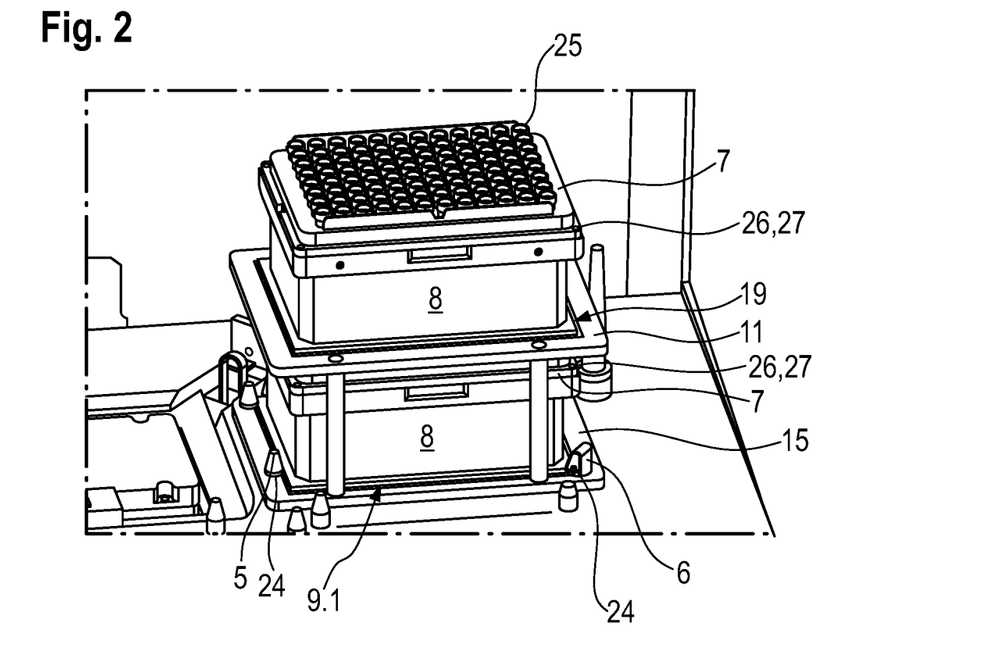
FIG. 2 illustrates a perspective view of an embodiment of a workstation with a low holder, pipette tip holders, and pipette tip carriers.

A pipette tip holder 8 is placed on the first frame 11 and a pipette tip carrier 7 with pipette tips 25 held therein is placed on the upper edge region of the pipette tip holder. At the corners of the upper edge, the pipette tip holder 8 has upwardly projecting pins 26 that engage from below in holes 27 in the edge region of the pipette tip carrier 7. As a result, the pipette tip carrier 7 is aligned on the pipette tip holder 8. The pipette tip holder 8 engages in the through-opening 19, wherein it rests on the narrow sides with its lower edges on the rest ledges 20, 21. The pipette tip holder 8 is aligned by means of the edges of the through-opening 19 such that the pipette tip carrier 7 is aligned on the holder 9.1. Another pipette tip holder 8 is placed directly on the workstation 3 and carries another pipette tip carrier 7 on the upper edge region.

The lower pipette tip holder 8 is inserted in the receiving opening 22. Due to the fact that the first aligning holes 24 are open toward the inside of the second frame 15, the pipette tip holder 8 is aligned in the receiving opening 22. Additionally or alternatively, the pipette tip holder 8 may be aligned in the holder 9.1 by means of the inner edges of the receiving opening.

Pipette tips 25 that are arranged in the upper pipette tip carrier 7 do not project above the bottom side or the first frame 11. As such, it is sufficient for the first frame 11 to be at a short distance from the pipette tips 25 held in the lower pipette tip carrier 7.

Figure 4:
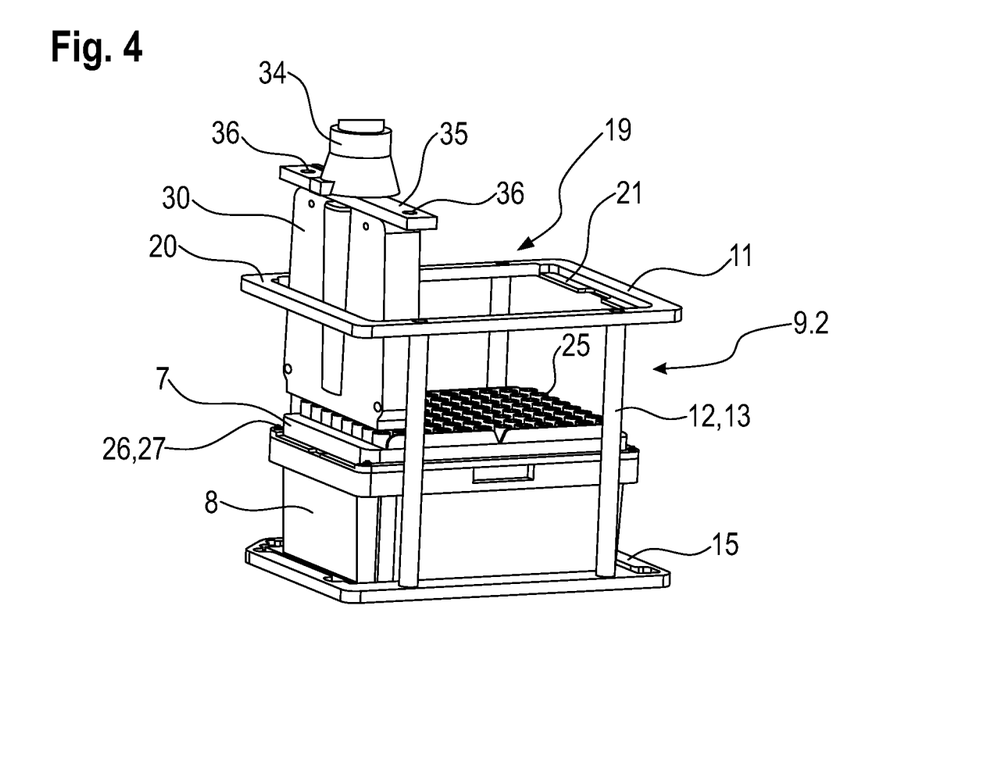
FIG. 4 illustrates a perspective view of an embodiment of a large holder during removal of pipette tips from a lower pipette tip carrier.

FIGS. 1 and 4 additionally show a larger embodiment of the holder 9.2, which differs from the low holder 9.1 in that the distance between the first frame 11 and second frame 15 is greater. The first frame 11 is at the same level as the top side of the upper pipette tip holder 7 on the lower holder 9.1. Therefore, in the larger holder 9.2, the upper pipette tip carrier 7 can be placed directly on the rest ledges 20, 21 of the first frame 15, wherein the pipette tips 25 project downward through the through-opening 19 of the first frame 11. Due to the greater height of the holder 92, they do not collide with the pipette tips 25 arranged below.

Figure 5:
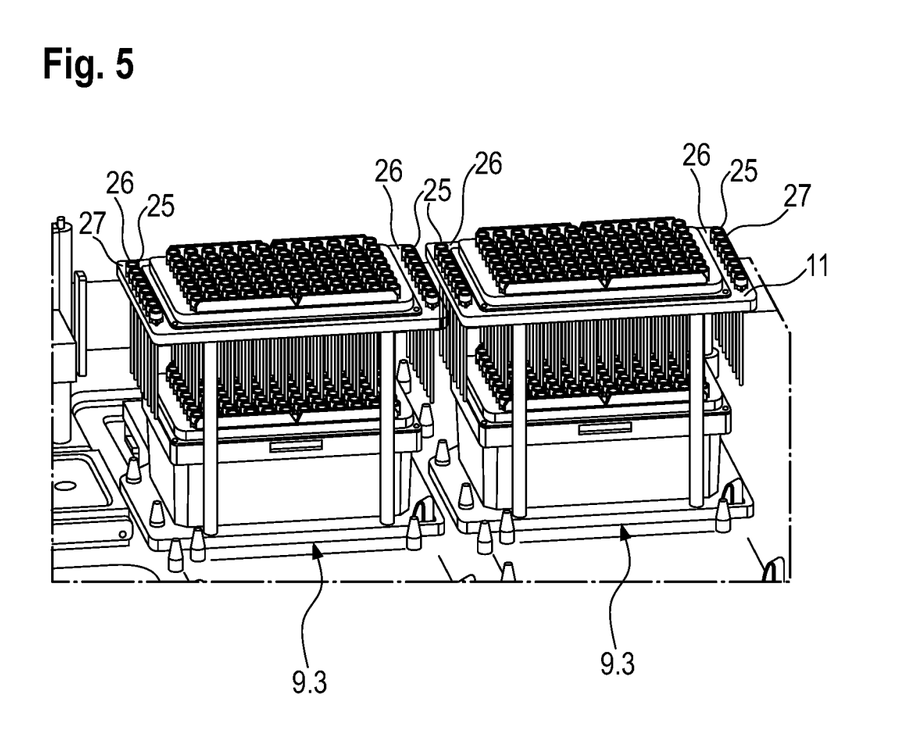
FIG. 5 illustrates an perspective view of two workstations with large pipette tip holders and pipette tip carriers.

FIG. 5 shows another embodiment of the larger holder 9.3, in which the first frame 11 comprises a row of holes 27 for receiving pipette tips 25 in each case on laterally projecting edges of the short frame parts 26. The pipette tip holders 7 are placed directly on the upper frame 11 such that all pipette tips 25 are arranged at approximately the same height on the first frame 11 and can be picked up using a pipetting tool.

Figure 6:
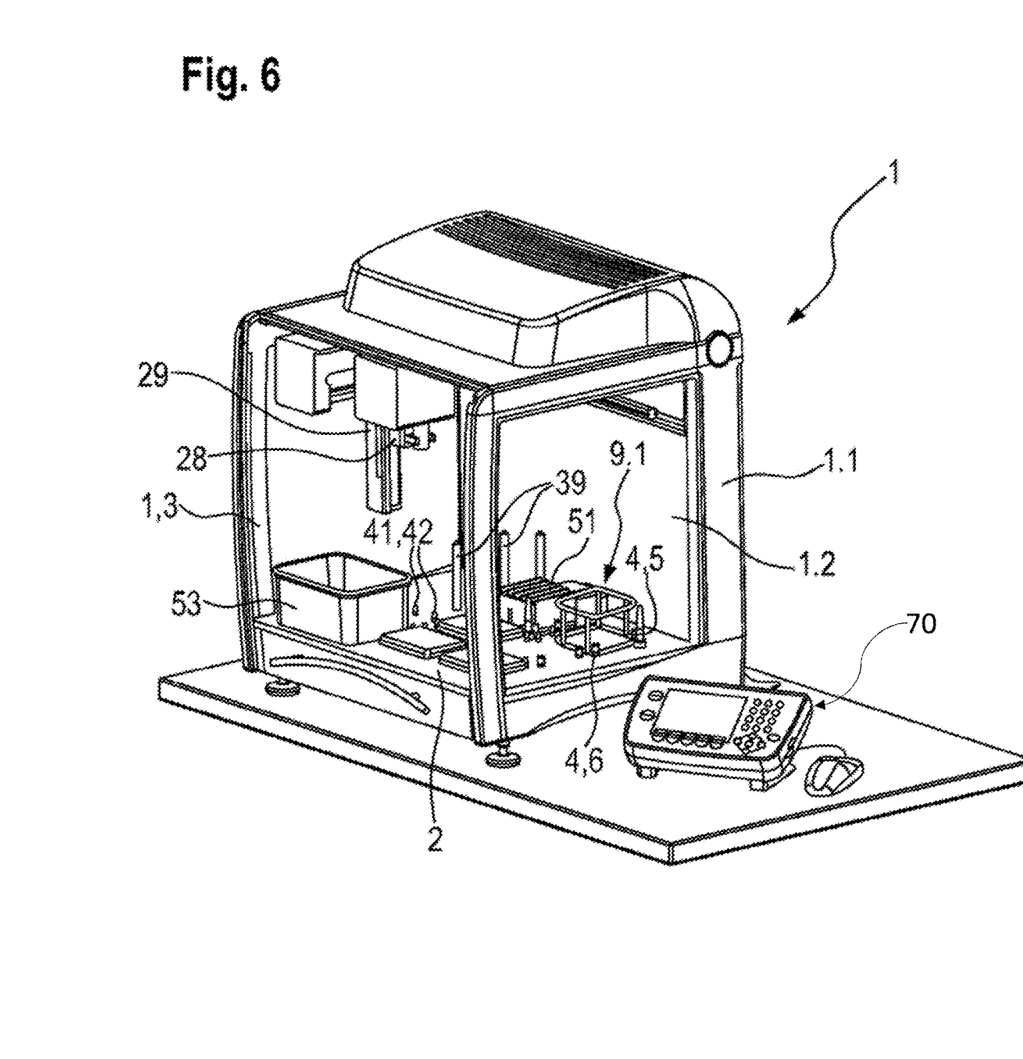
FIG. 6 illustrates a perspective view of an embodiment of the automated laboratory system.

According to FIG. 6, the automated laboratory system 1 comprises a tool holder 28 on an XYZ robot arm (three-axis transferring means) 29 above the work area 2 in a housing 1.1 having windows 1.2 in the side walls and a door 1.3 that can slide upward in the front side. Movement of the tool holder 28 is controlled by an electronic control apparatus 70. The tool holder 28 comprises a neck receptacle for receiving various tools, including at least one pipetting tool 30 and a gripper tool 31 (cf. FIG. 1, 4, 8).

At Least one pipetting tool 30 (cf. FIG. 1, 4) is a multichannel pipetting tool, for example an eight-channel pipetting tool. A single-channel pipetting tool may also be provided. Multiple multichannel pipetting tools and/or multiple single-channel pipetting tools that cover various volume ranges may be provided.

The gripper tool 31 (cf. FIG. 8) comprises gripping arms 32 that can pivot about horizontal axes and that comprise needles 33 projecting on mutually facing inner sides for securely clamping laboratory items. All tools 30, 31 have a fastening neck 34 at the top which can be inserted into and secured in the neck receptacle of the tool holder 28. If the fastening neck 34 has been inserted into the neck receptacle, the robot arm 29 can transfer a drive movement to the relevant tool 30, 31. For this purpose, a drive shaft is provided in the tool holder 28 and a spindle that can be coupled to the drive shaft via coupling apparatuses is provided in each case in the tools 30, 31. In the pipetting tool 30, the drive movement serves to move a piston in a cylinder, which displaces an air cushion, which draws liquid into or ejects liquid from the one or more pipette tips 25. In the gripper tool 31, the drive movement causes the gripping arms 32 to pivot. Details relating to the pipetting tool 30, gripper tool 31 and tool holder for an automated laboratory system 1 are described in EP 1 407 861 B1.

The pipetting tool 30 comprises a crossbeam 25 at the top, from which the fastening neck 34 projects upward. The crossbeam has holes 36 on the ends. Behind, rods 37 comprising necks 38 on the upper ends project up from the work area, wherein one pair of rods in each case form, a storage place 39 for a pipetting tool 30. By means of the holes in the crossbeam, the pipetting tools 30 can be pushed onto the necks on the upper ends of the rods such that they are held thereon.

Figure 7:
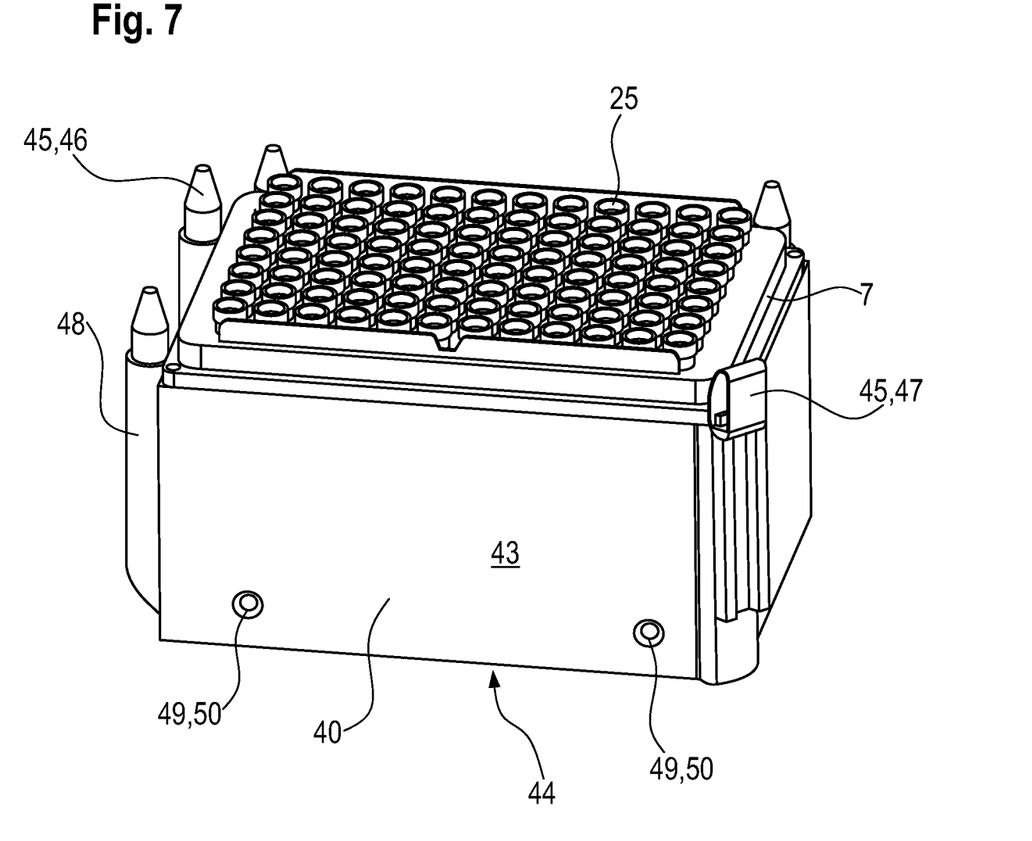
FIG. 7 illustrates a perspective view of an embodiment of an adapter with a pipette tip carrier arranged thereon.
Figure 8:
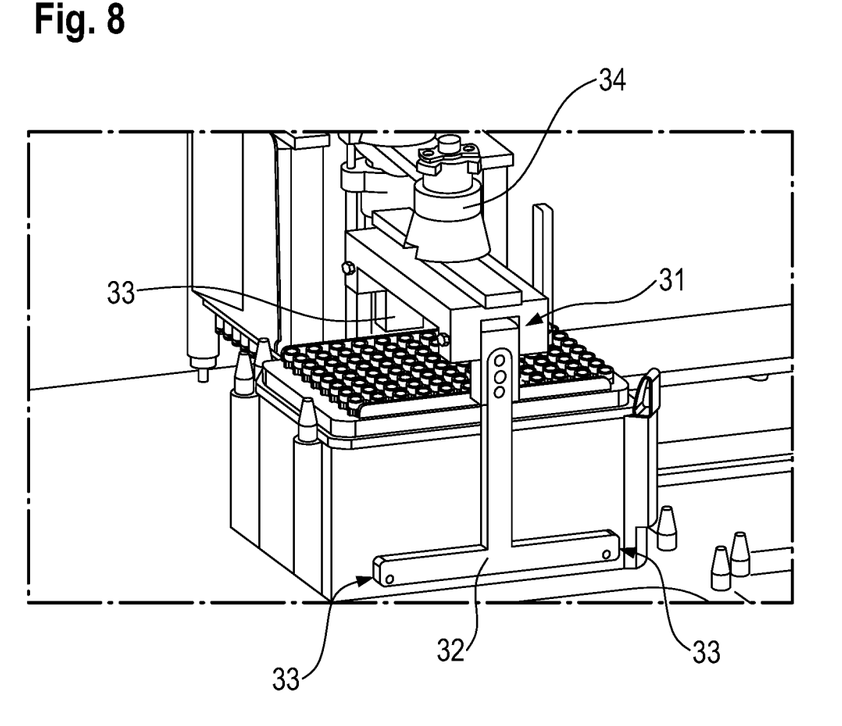
FIG. 8 illustrates a perspective view of an embodiment of a storage place in the work area of an automated laboratory system with an adapter placed thereon with a pipette tip carrier placed on the adapter and a gripper tool mounted on the adapter.

According to FIGS. 7 and 8, the gripper tool can be mounted on an adapter 40 in the work area 2. For this purpose, the work area 2 comprises third aligning elements 41 in the form of two upwardly pointing pins 42 that are rigidly connected to the work area 2 (cf. FIG. 6). The adapter 40 comprises a rectangular tube 43 that is closed at the bottom by a base 44. In the base, the adapter 40 comprises fourth aligning elements in the form of vertical aligning holes.

The upper edge of the tube 43 is configured to support a pipette tip carrier 7, such that pipette tips 25 held therein reach into the tube. The adapter 40 comprises an arrangement of fifth aligning elements 45 on the upper edge for aligning the pipette tip carrier 7 on the adapter. Said arrangement of fifth aligning elements is formed by an arrangement of third pins 46 and a second spring element 47, which corresponds to the arrangement of the first pins 5 and first spring element 6 that delimit the workstations 3. In the corners, the adapter comprises projecting ribs 48, on the upper ends of which the third pins 46 and the second spring element 47 are secured. The pipette tip carrier 7 is held on the adapter 40 such that its lateral edges end flush with the side walls of the adapter 40.

In the side walls, the adapter 40 comprises means for positive connection 49 to the transport tool that are formed by centering holes 50 in which the needles 33 of the gripper tool 31 can engage. FIG. 8 shows the gripper tool 31 positively connected to the adapter 40. The gripper tool 31 thereby spans a pipette tip carrier 7 placed on the upper edge of the adapter 40.

According to FIGS. 1 and 6, a rack 51 for reservoirs or vessels is held on another workstation 3. A rack 51 of this kind and associated reservoirs as well as modules for holding vessels are described, for example, in EP 2 168 684 B1. At the froth, the work area has a recess 52 that receives a tub-shaped waste container 53.

The pipette tips 25 can be picked up from the pipette tip carriers 7 by means of the multichannel pipetting tool 30. They can then be used for the pipetting. After pipetting, they can be discarded into a waste container 53. When all pipette tips 25 have been taken out of a pipette tip carrier 7 arranged on the first frame 11 of a holder 9.1, 9.2, the pipetting tool 30 can be placed on the rods 37 and separated from the tool holder 28. The gripper tool 31 can then be connected to the tool holder 28 and used to remove the pipette tip carrier 7 from the first frame 11 of the holder 9.1, 9.2. The pipette tip carrier 7 may for example be discarded into the waste container 53.

Afterwards, the gripper tool 31 can again be mounted on the adapter 40 and the tool holder 28 can be coupled to a pipetting tool 30. According to FIGS. 1 and 4, the pipetting tool 30 can be introduced into the through-opening 19 of the first frame 11 in order to take pipette tips 25 out of a pipette tip carrier 7 mounted on a pipette tip holder 8 below the first frame 11.

In order to use the pipette tips 25 stored on the adapter 40, the pipetting tool 30 is placed down on its storage place 39 and the tool holder 28 is connected to the gripper tool 31. By means of the gripper tool 31, the pipette tip carrier 7 is taken off the adapter 40 and placed down on a first frame 11 of a holder 9.1, 9.2 on which no pipette tip carrier 7 is resting. Subsequently, the gripper tool 31 is mounted on the adapter 40 and the pipetting tool 30 is connected to the tool holder 28. Afterwards, pipette tips 25 can be taken off the pipette tip carrier 7.

The work area 2 can be equipped with pipette tips 25 by hand prior to laboratory sample processing. For this purpose, pipette tip holders 8 with pipette tip carriers 7 placed thereon and with pipette tips 25 held in the pipette tip carriers can be placed on one or more workstations. Afterwards, at least one holder 9.1, 9.2 is placed on the work area 2, wherein the first aligning elements 4 are introduced into the second aligning elements 24. Depending on the design of the holder 9.1, 9.2, a pipette tip carrier 7 is either placed directly on the first frame 11 or a pipette tip holder 8 with a pipette tip carrier 7 placed thereon is placed on said first frame. In the holder 9.3, the holes 27 in the first frame 11 may additionally be equipped with two rows of additional pipette tips 25.

Finally, the adapter 40 may also be equipped with another pipette tip carrier 7. During execution of the program, the automated laboratory system 1 draws on the pipette tips 25 stored on the various frames 11, 15 of the at least one holder 9.1, 9.2 as well as on the pipette tips 25 stored on the adapter 40.

LIST OF REFERENCE SIGNS

1 Automated laboratory system
1.1 Housing
1.2 Window
1.3 Door
2 Work area
3 Workstation
4 Aligning element
5 First pins
6 First spring element
7 Pipette tip carrier
8 Pipette tip holder
9.1 Low holder
9.2 Large holder
9.3 Larger holder
10 Carrying apparatus
11 First frame
12 Support apparatus
13 Rod
14 Bearing apparatus
15 Second frame
16 Screw
17 Screw head
18 Depression
19 Through-opening
20, 21 Rest ledge
22 Receiving opening
23 aligning element
24 Aligning hole
25 Pipette tip
26 Pin
27 Hole
28 Tool holder
29 Robot arm
30 Pipetting tool
31 Gripper tool
32 Gripping arm
33 Needle
34 Fastening neck
35 Crossbeam
36 Holes
37 Rod
38 Neck
39 Storage place
40 Adapter
41 Aligning element
42 Pin
43 Tube
44 Base
45 Aligning element
46 Third pin
47 Second spring element
48 Rib
49 Means for connection
50 Centering hole
51 Rack
52 Recess
53 Waste container

The invention claimed is:

1. An automated laboratory system for automatically handling laboratory samples, the automated laboratory system comprising:
a work area;
a plurality of predefined workstations in the work area, wherein each of the plurality of predefined workstations occupies a footprint of a standardized microtiter plate;
at least one tool holder configured to move tools above the work area;
at least one transport tool configured to be moved by the at least one tool holder in order to relocate laboratory items within the work area;
at least one pipetting tool configured to be moved by the at least one tool holder in order to pick up and to release pipette tips, and in order to take up and dispense liquids within the work area using the pipette tips;
a holder for at least one pipette tip carrier, the holder comprising:
at least one carrying apparatus defining a rectangular through-opening; and
a support apparatus connected to the at least one carrying apparatus; and
an electronic control apparatus connected to the at least one tool holder and configured to control movements of the at least one transport tool and at least one pipetting tool by the at least one tool holder such that pipette tips are picked up from the at least one pipette tip carrier mounted on the at least one carrying apparatus by the at least one pipetting tool,
wherein the holder with the support apparatus is located on the work area beside the at least one pipette tip carrier mounted on one of the plurality of predefined workstations,
wherein the at least one carrying apparatus is arranged above the at least one pipette tip carrier and configured to occupy a footprint of the standardized microtiter plate,
wherein the pipette tips are configured to be picked up from the at least one pipette tip carrier mounted below the at least one carrying apparatus through the rectangular through-opening of the at least one carrying apparatus by the at least one pipetting tool,
wherein the at least one pipette tip carrier is configured to occupy the footprint of the standardized microtiter plate is mounted on the at least one carrying apparatus, and
wherein the pipette tip carrier is configured to be removed from the at least one carrying apparatus by the at least one transport tool.

2. The automated laboratory system according to claim 1, wherein the holder comprises a bearing apparatus coupled to the support apparatus and configured to support the suppport apparatus on the work area, and wherein the bearing apparatus is configured to support one of the at least one pipette tip carrier and a pipette tip holder along an edge of the bearing apparatus.

3. The automated laboratory system according to claim 1, wherein the holder comprises a bearing apparatus coupled to the support apparatus and configured to support the support apparatus on the work area, and wherein the bearing apparatus is configured to support one of the at least one pipette tip carrier and a pipette tip holder along an edge of the bearing apparatus.

4. The automated laboratory system according to claim 3, wherein the at least one carrying apparatus is a rectangular first frame and the bearing apparatus is a rectangular second frame.

5. The automated laboratory system according to claim 1, wherein the support apparatus comprises a plurality of rods each extending from a first end to second end, wherein the first end is connected to the at least one carrying apparatus and the second end is connected to the bearing apparatus.

6. The automated laboratory system according to claim 1, wherein the plurality of predefined workstations comprise an arrangement of first aligning elements that are configured to align a standardized microtiter plate inserted in between on one of the plurality of predefined workstation, and the holder comprises second aligning elements structured to engage the first aligning elements.

7. The automated laboratory system according to claim 6, wherein the first aligning elements comprise multiple first pins and at least one first spring element which are coupled to and extend away up from the work area, wherein the first aligning elements are positioned at corners of the plurality of predefined workstations, and wherein the second aligning elements comprise first aligning holes configured to receive the first pins and the at least one first spring element.

8. The automated laboratory system according to claim 1, wherein the at least one carrying apparatus is arranged at a distance from a bottom side of the holder that exceeds a height of an arrangement comprising a pipette tip holder with the at least one pipette tip carrier placed thereon and the pipette tips held in the at least one pipette tip carrier.

9. The automated laboratory system according to claim 3, further comprising a first frame coupled to the holder, wherein the first frame comprises rest ledges that are offset from a top surface of the first frame and at least partially surround the rectangular through-opening, and wherein the first frame is configured for supporting one of the at least one pipette tip carrier and the pipette tip holder on the rest ledges.

10. The automated laboratory system according to claim 9, wherein the first frame of the holder comprises a row of holes on an outer edge of the first frame, wherein each hole in the row is configured to receive a pipette tip.

11. The automated laboratory system according to claim 1, wherein the at least one transport tool is a gripper tool that comprises,
    gripping arms configured to pivot about a pivot axis, and
    needles projecting from the gripping arms and configured to be pivoted together by the at least one tool holder in order to grip at least one of the laboratory items and configured to be pivoted apart in order to release the at least one of the laboratory items.

12. The automated laboratory system according to claim 11, wherein the predefined storage place comprises an arrangement of third aligning elements configured to align the adapter on the predefined storage place.

* * * * *